United States Patent [19]
Kitaura et al.

[11] Patent Number: 5,387,982
[45] Date of Patent: Feb. 7, 1995

[54] APPARATUS FOR PERFORMING INVERSE DISCRETE COSINE TRANSFORM

[75] Inventors: Aoi Kitaura, Tenri; Kenji Kawahara, Nara, both of Japan

[73] Assignee: Sharp Kabushiki Kaisha, Osaka, Japan

[21] Appl. No.: 30,553

[22] Filed: Mar. 12, 1993

[30] Foreign Application Priority Data

Aug. 4, 1992 [JP] Japan .................. 4-207898

[51] Int. Cl.$^6$ ............................. H04N 1/415
[52] U.S. Cl. .................... 358/433; 358/432; 358/426; 382/56
[58] Field of Search ............ 358/433, 432, 261.1, 358/261.2, 261.3, 426; 382/56; 364/725

[56] References Cited

U.S. PATENT DOCUMENTS 5,054,103 10/1991 Yasuda et al. .................. 382/56
5,196,946 3/1993 Balkanski et al. ............... 358/483

FOREIGN PATENT DOCUMENTS 9213177 6/1992 Japan .

OTHER PUBLICATIONS

U. Totzek, et al, "CMOS VLSI Implementation of the 2-D-DCT with Linear Processor Arrays" pp. 937-940, Proc. of Int. Conf. on Acoustic, Speech, and Signal Processing, IEEE, 1990.

Y. Inoue, et al "A 100 MHz 2-Dimensional Discrete Cosine Transform Core LSI", pp. 1-8, ICD91-109, 1991.

Y. Uetani, et al "High-Precision and High-Speed DCT-LSI", pp. 623-626, Toshiba Review vol. 45, No. 8, 1990.

*Primary Examiner*—Edward L. Coles, Sr.
*Assistant Examiner*—Thomas D. Lee

[57] ABSTRACT

An apparatus for performing an inverse discrete cosine transform, which reduces the number of operation times of the inverse discrete cosine transform including a row and column priority determining unit 10 for determining a priority direction of an operation at a time when a two-dimensional inverse discrete cosine transform is replaced with at least one one-dimensional inverse discrete cosine transform, one-dimensional inverse DCT operating units 11, 13 connected to the row and column priority determining unit 10 for detecting zero elements and for performing a multiply-addition according to a result of the detection, and a random access memory 12, connected to the one-dimensional inverse DCT operating units 11, 13 for storing a result of the multiply-addition performed by the one-dimensional inverse DCT operating unit 11.

4 Claims, 4 Drawing Sheets

Fig. 4

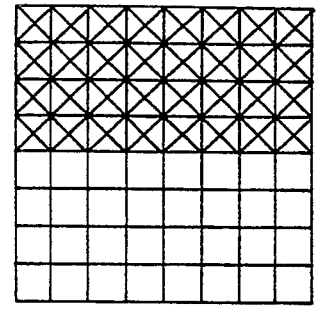
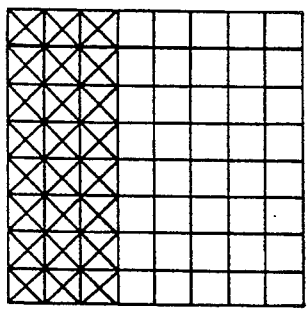
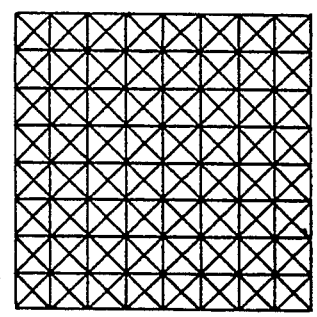

$q_0 q_1 q_2 q_3 q_4 q_5 q_6 q_7$    $Q=3$
1 3 1 0 0 0 0 0

$p_0$ 2
$p_1$ 1
$p_2$ 1
$p_3$ 1
$p_4$ 0
$p_5$ 0
$p_6$ 0
$p_7$ 0

$P=4$

PRIORITY IS ON A ROW → OPERATING TIMES $8 \Sigma P_i = 8S$

PRIORITY IS ON A COLUMN ↓ OPERATING TIMES $8 \Sigma q_i = 8S$

COLUMN ↓ OPERATING TIME $64P$

ROW → OPERATING TIMES $64Q$

⊠ NON-ZERO ELEMENT
S  NUMBER OF NON-ZERO ELEMENTS
P  NUMBER OF ROWS HAVING NON-ZERO ELEMENTS
Q  NUMBER OF COLUMNS HAVING NON-ZERO ELEMENTS

TOTAL NUMBER OF OPERATIONS

PRIORITY ON A ROW    $8\Sigma p_i + 64P = 8S + 64P = 296$

PRIORITY ON A COLUMN    $8\Sigma p_i + 64Q = 8S + 64Q = 232$

APPARATUS FOR PERFORMING INVERSE DISCRETE COSINE TRANSFORM

BACKGROUND OF THE INVENTION

1. Field of the Invention

The present invention relates to an image compressing technique, and more particularly it relates to an apparatus for performing an inverse discrete cosine transform (inverse DCT), which may be applied for decoding compressed image data.

2. Description of the Related Art

The inventors of the present invention know that the following two techniques (A) and (B) have been proposed in order to form an apparatus for performing an inverse discrete cosine transform (referred to as an inverse DCT).

(A) A technique of decomposing a two-dimensional inverse DCT into two one-dimensional inverse DCTs.

The inverse DCT is, as a transformation, a simple multiply-addition having a cosine function as its coefficient. To obtain the two-dimensional N-degree inverse DCT, where N represents a positive integer, the following equation (1) is used.

$$f(i,j) = \sum_{u=0}^{N-1} \sum_{v=0}^{N-1} \{C(i,u,j,v) \times F(u,v)\} \quad \text{equation (1)}$$

wherein F(u, v) denotes a pixel value of a compressed image, f(i, j) denotes a pixel value of a reconstructed image, and C(i, u, j, v), C(u) and C(v) are as follows.

$$C(i,u,j,v) = \frac{C(u)C(v)}{4} \times \cos\frac{(2i+1)u\pi}{2N} \times \cos\frac{(2j+1)v\pi}{2N}$$

$$C(u) = \frac{1}{\sqrt{2}} \text{ for } u = 0, \ C(u) = 1 \text{ for } u = 1, \ldots, N-1$$

$$C(v) = \frac{1}{\sqrt{2}} \text{ for } v = 0, \ C(v) = 1 \text{ for } v = 1, \ldots, N-1$$

In general, the two-dimensional inverse DCT could be decomposed into two one-dimensional inverse DCTs.

At first, the one-dimensional inverse DCT is carried out in the row (horizontal) direction.

Second, the one-dimensional inverse ECT is carried out in the column (vertical) direction with respect to the result of the first inverse DCT. For the known technique, the direction of the inverse DCT to be done at the first time is fixed.

The two-dimensional inverse DCT of the equation (1) could be decomposed into a one-dimensional N-degree inverse DCT in the row (horizontal) direction as in equation (2), and a one-dimensional N-degree inverse DCT in the column (vertical) direction as in equation (3).

$$f^c(i,v) = \sum_{u=0}^{N-1} \{C(i,u) \times F(u,v)\} \ (i, v = 0, \ldots, N-1) \quad \text{equation (2)}$$

$$f(i,j) = \sum_{v=0}^{N-1} \{C(j,v) \times f^c(i,v)\} \ (i, j = 0, \ldots, N-1) \quad \text{equation (3)}$$

where F(u, v) denotes a pixel value of a compressed image, f$^c$(i, v) denotes an output value of the row-directional inverse DCT, f (i, j) denotes a pixel value of a reconstructed image, and C(i, u), C(j, v), C(u) and C(v) are as follows.

$$C(i,u) = \frac{C(u)}{2} \times \cos\frac{(2i+1)u\pi}{2N}$$

$$C(j,v) = \frac{C(v)}{2} \times \cos\frac{(2j+1)v\pi}{2N}$$

$$C(u) = \frac{1}{\sqrt{2}} \text{ for } u = 0, \ C(u) = 1 \text{ for } u = 1, \ldots, N-1$$

$$C(v) = \frac{1}{\sqrt{2}} \text{ for } v = 0, \ C(v) = 1 \text{ for } v = 1, \ldots, N-1$$

(B) A technique of performing a multiply-addition with considering zero inputs.

The two-dimensional inverse DCT receives, as an input, pixel values of the compressed image. Hence, the input contains a lot of zero elements. To cope with the input, it is known that the inverse DCT is performed considering such zero inputs. In one type of technique, any zero element is detected from the input elements, and only when a non-zero element is detected, the multiply-addition is carried out for implementing the inverse DCT.

In another technique, any zero element is detected, and only if a non-zero element is detected, is the value is stored in a RAM. The multiply-addition is carried out with respect to the value(s) stored in the RAM.

Now consider that the inverse DCT is carried out with respect to the input image consisting of N×N pixels. In this case, the required number of multiply-addition is derived as follows.

Assuming that the number of non-zero elements in N×N pixels is S, the number of rows having non-zero elements is P and the number of columns having non-zero elements is Q, then if the two-dimensional inverse DCT is carried out directly (without using the techniques (A) and (B) described above), the number of multiply-addition is N$^4$. If two one-dimensional inverse DCTs are carried out (which holds true to the technique (A) only), then the number of multiply-addition is 2N$^3$. If the two-dimensional inverse DCT is directly carried out considering non-zero elements (which holds true to the technique (B)), then the number is N$^2$S. If two one-dimensional inverse DCTs are carried out considering non-zero elements (which holds true to the techniques (A) and (B)), the number is NS+N$^2$P or NS+N$^2$Q.

Therefore, even though both of the above-mentioned known techniques (A) and (B) are used, the direction in which the inverse DCT is performed at first is fixed. Hence, it seems very probable that a direction requiring more multiply-additions may be selected, and this has been a serious drawback in the above-mentioned known techniques.

SUMMARY OF THE INVENTION

It is an object of the present invention to provide an apparatus for performing an inverse discrete cosine transform (inverse DCT), which is adapted to reduce the number of operation times substantially.

The object of the present invention can be achieved by an apparatus for performing an inverse discrete cosine transform, which is adapted to reduce the number of operations of the inverse discrete cosine transform, the apparatus includes a unit for determining a priority direction of an operation at a time when a two-dimensional inverse discrete cosine transform is replacing with a predetermined number of times of one-dimensional inverse discrete cosine transforms, a unit connected to the determining unit for operating a specific input element and for performing a predetermined operation according to a result of the detection, and a unit connected to the operating unit for storing a result of the predetermined operation performed by the operating unit.

The determining unit is adapted to determine the priority direction of the operation from either a row direction or a column direction.

The operating unit comprises a first operating unit connected to the determining unit for operating the specific input element and for performing a multiply-addition as the predetermined operation according to the detected result.

The operating unit further comprises a second operating unit connected to both of the storage unit and the determining unit for operating the specific input element and for performing a multiply-addition as the predetermined operation according to the detected result.

Any one of the first operating unit and the second operating unit includes a control circuit, a selector connected to the control circuit, a zero element detector connected to the selector, a controllable multiply-addition unit connected to both of the selector and the zero element detector, a memory connected to both of the control circuit and the controllable multiply-addition unit.

The control circuit is adapted to output control signals to both of the selector and the memory, and the selector is adapted to output an input data corresponding to an operating direction of the first operating unit according to the control signal output from the control circuit, the input data output from the selector being applied to the zero element detector as well as to the controllable multiply-addition unit.

The memory is adapted to store cosine coefficients and to output a cosine coefficient according to the control signal output from the control circuit.

The zero element detector is adapted to detect any zero element contained in the input data output from the selector.

The zero element detector is so arranged that a signal of "0" is output therefrom if any zero element is detected, and a signal of "1" is output therefrom if a non-zero element is detected, the output from the zero element detector being applied to the controllable multiply-addition unit as a control signal.

The controllable multiply-addition unit is adapted to be operative only if the control signal output from the zero element detector is "1", and the controllable multiply-addition unit is also adapted to perform an operation by using the input data output from the selector and the cosine coefficient output from the memory.

In operation, the determining unit serves to determine which direction, row or column, to be performed first when the two-dimensional inverse discrete cosine transform is replaced with a specific number of one-dimensional inverse DCTs for implementing the two-dimensional inverse DCT. The first operating unit serves to detect a specific input element and perform the multiply-addition in the determined direction based on the detected input element. The storage unit stores the operated result of the first operating unit. The second operating unit serves to detect a specific input element and perform the multiply-addition with respect to the value stored in the storage unit based on the detected result.

Further objects and advantages of the present invention will be apparent from the following description of the preferred embodiment of the invention as illustrated in the accompanying drawings.

BRIEF DESCRIPTION OF THE DRAWINGS

FIG. 4 is an explanatory view showing a process of an inverse DCT operation performed in the inverse DCT operating unit.

DESCRIPTION OF PREFERRED EMBODIMENT

Referring to the accompanying drawings, an embodiment of an apparatus for performing an inverse discrete cosine transform (inverse DCT) according to the present invention will be described in detail.

Figure 1:
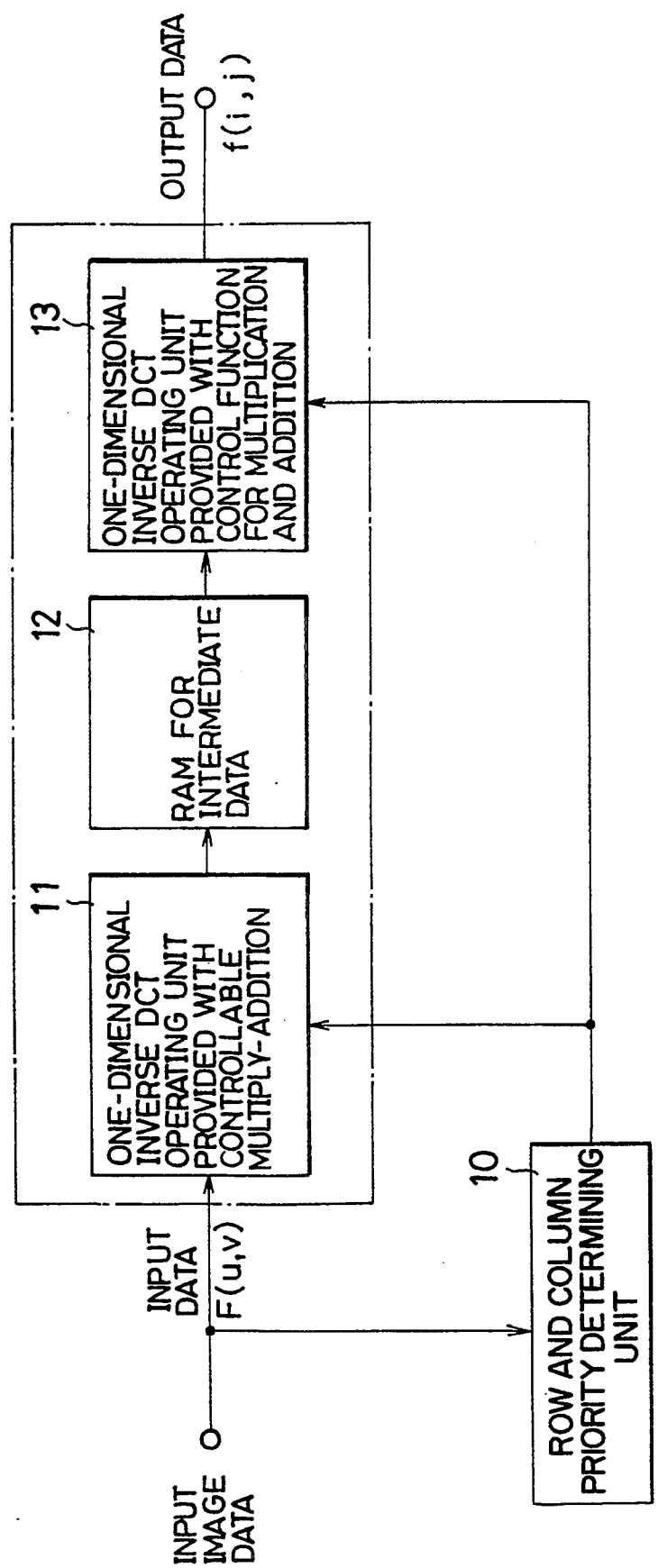
FIG. 1 is a block diagram showing an arrangement of an apparatus for performing an inverse DCT operation according to an embodiment of the present invention.

FIG. 1 is a block diagram showing a configuration of the apparatus for performing an inverse DCT according to this embodiment.

As shown in FIG. 1, the apparatus for performing an inverse DCT includes a row and column priority determining unit 10, a first one-dimensional inverse DCT operating unit 11 provided with a controllable multiply-addition unit (referred to as a first one-dimensional inverse DCT DCT operating unit, hereinafter), a memory 12 for storing an intermediate result (in this embodiment it is represented by a random access memory (RAM)), and another one-dimensional inverse DCT operating unit 13 provided with a controllable multiply-addition unit (referred to as a second one-dimensional inverse DCT operating unit, hereinafter).

The first one-dimensional inverse DCT operating unit 11 is connected to the row and column priority determining unit 10. The RAM 12 is connected to the first one-dimensional inverse DCT operating unit 11. The second one-dimensional inverse DCT operating unit 13 connected to the row and column priority determining unit 10 as we 11 as to the RAM 12.

Figure 2:
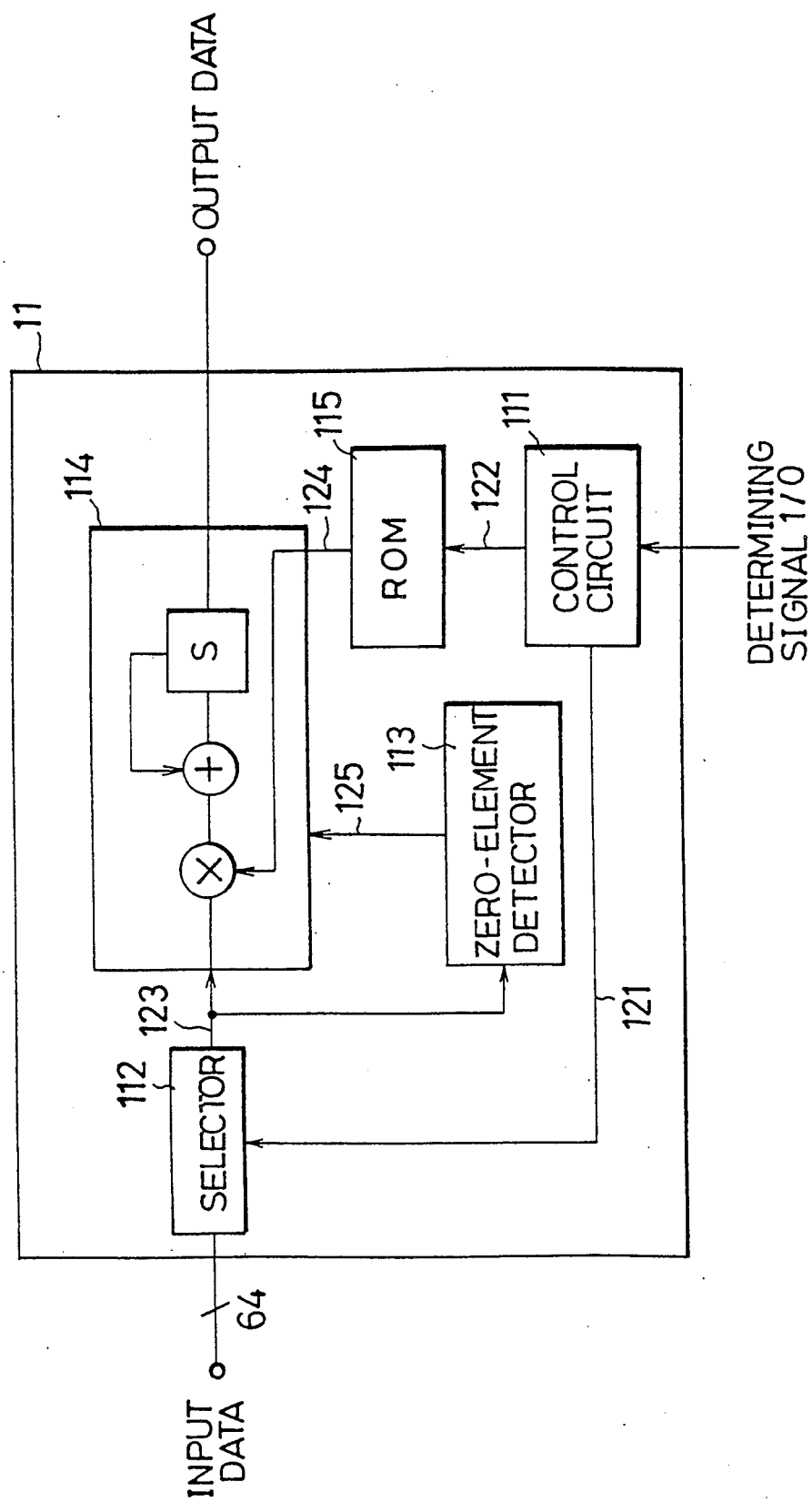
FIG. 2 is a block diagram showing an arrangement of a one-dimensional inverse DCT operating unit provided with a controllable multiply-addition, included in the apparatus shown in FIG. 1.

FIG. 2 shows a configuration of the first one-dimensional inverse DCT operating unit 11 in detail. Notice that the second one-dimensional inverse DCT operating unit 13 has also the same configuration as FIG. 2.

As shown in FIG. 2, the first one-dimensional inverse DCT operating unit 11 includes a control circuit 111, a selector 112, a zero element detector 113, a controllable multiply-addition unit 114, and a read-only memory (ROM) 115 for storing cosine coefficients.

The operation of the apparatus according to this embodiment and its components will be described with reference to FIGS. 1 and 2 below.

First, the input image data is applied to the row and column priority determining unit 10 for counting the number P of rows having non-zero elements and the number Q of columns having non-zeros elements.

If P>Q in the determined result by the row and column priority determining unit 10, the one-dimensional inverse DCT operating unit 11 performs an operation in the column direction, and the one-dimensional inverse DCT operating unit 13 performs an operation in the row direction.

If P≦Q in the determined result by the row and column priority determining unit 10, the one-dimensional inverse DCT operating unit 11 performs an operation in the row direction, and the one-dimensional inverse DCT operating unit 13 performs an operation in the column direction.

The input data F(u, v) is applied to the one-dimensional inverse DCT operating unit 11. Then, the data F(u, v) is sent to the selector 112 of the one-dimensional inverse DCT operating unit 11.

The determining signal output from the row and column priority determining unit 10 is applied to the control circuit 111 of the one dimensional inverse DCT operating unit 11.

The control circuit 111 serves to output control signals 121 and 122 to the selector 112 and the ROM 115.

The selector 112 outputs the input data 123 corresponding to the operating direction of the one-dimensional inverse DCT operating unit 11 according to the control signal 121 output from the control circuit 111.

The ROM 115 outputs a cosine coefficient 124 according to the control signal 122.

The output 123 from the selector 112 is applied to the zero element detector 113 as well as to the controllable multiply-addition unit 114.

The zero element detector 113 detects any zero elements in the input data 123. If any zero element is detected, then the zero element detector 113 outputs a signal of "0". If non-zero element is detected, then the zero element detector 113 outputs a signal of "1".

The output 125 from the zero element detector 113 is applied to the controllable multiply-addition unit 114 as a control signal.

The controllable multiply-addition unit 114 is operative only if the control signal is "1".

The controllable multiply-addition unit 114 performs an operation using the input data 123 and the cosine coefficient 124.

According to the foregoing operating steps, the one-dimensional inverse DCT operating unit 11 serves to perform the one-dimensional inverse DCT operation in either a row (horizontal) direction or a column (vertical) direction determined by the row and column priority determining unit 10.

The operated result is sent to the RAM 12 and stored as an intermediate result in the RAM 12.

The data stored in the RAM 12 is applied to the second one-dimensional inverse DCT operating unit 13 as input data $f^c$.

The second one-dimensional inverse DCT operating unit 13 operates in the similar manner as to the first one-dimensional inverse DCT operating unit 11, except that the direction to be operated by the second one-dimensional inverse DCT operating unit 13 is perpendicular to the direction to be operated by the first one-dimensional inverse DCT operating unit 11. The operated result of the second one-dimensional operating unit 13 is represented as the output data f (i, j).

Figure 3:
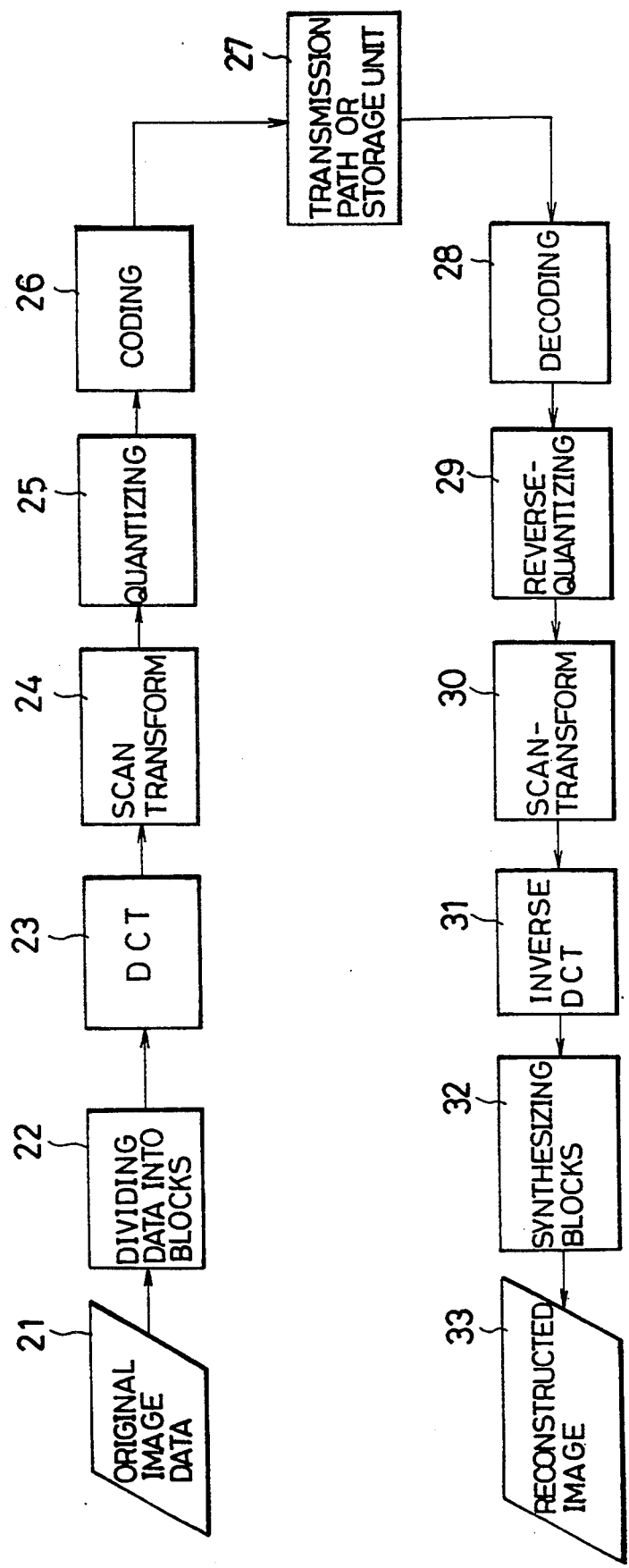
FIG. 3 is a flowchart showing a routine for compressing an image using an inverse DCT.

Referring to FIG. 3, operation of the image compression based on the DCT will be described below with the reference numerals of 21 through 33 in FIG. 3.

At first, the two-dimensional DCT operation is carried out with respect to the two-dimensional image data f(i, j) for deriving each horizontal and vertical spatial frequency component F(u, v), then high-frequency components and components approximately equal to zero are removed from the component F (u, v). The remaining F (u, v) is scan-transformed for quantization as shown in FIG. 3, and the pair of (RUN, LEVEL) is sequentially obtained as a result. Each pair is transformed into a variable-length code, and the concatenation of those variable-length codes results in compressed data S. Here, RUN denotes the number of consecutive zeros and LEVEL denotes a non-zero element following the zeros.

To decompress the image, the reverse operation is carried out. The input image F(u, v) contains a lot of zero elements in the inverse DCT operation, it uses the feature of the invention, that is, the apparatus is inoperative to perform a multiply-addition when a value of an input element is zero. When deriving F(u, v) from the pair of (RUN, LEVEL), a detection of the zero elements of F(u, v) can be easily obtained from the value of RUN. In addition, the number P of the row having non-zero elements and the number Q of the column having non-zero elements also can be obtained from the value of RUN.

Next, the operation of the inverse DCT operating unit shown in FIG. 1 will be described as referring to the arrangement shown in FIG. 4.

Utilizing equation (1), the inverse DCT operating unit of this invention operates as follows.

(a) For a block of an input image, the number P of non-zero rows and the number Q of non-zero columns are counted, and the counted numbers P and Q are compared with each other.

(b) If P>Q, the zero-considering one-dimensional inverse DCT is carried out in the column (vertical) direction. If P≦Q, the zero-considering one-dimensional inverse DCT is carried out in the row (horizontal) direction.

(c) The zero-considering one-dimensional inverse DCT is carried out in the other direction which is not to be done in the above (b).

The zero-considering one-dimensional inverse DCT performs the following operation.

$$f(x) = \sum_{u=0}^{N-1} \{C(x,u) \times F(u)\}$$

For all the values of x, the following operation is repeated.

S1=0

With u satisfying F(u)≠0,

S1=S1+C(x, u) x F (u)

is repeated.

f(x)=S1

According to the foregoing operation, the multiply-addition is repeated only when the input value F(u) is a non-zero element, as a consequence, the number of the multiply-addition is reduced.

As described above, according to the apparatus for performing an inverse DCT of the present invention, if S is the number of non-zero elements in the N×N pixels of the input image, the number of the operations times becomes {NS+N²min(P, Q)}, which is smaller than the number of the operation times performed by the above-mentioned known apparatus. In particular, this feature of the invention is effective when the values of P and Q are smaller than N, that is, it is effective when coding at a low bit rate.

For example, assuming that P=4 and Q=3 as shown in FIG. 4, the number of multiply-addition given when priority is placed on the row direction becomes 8Σpi+64P=8S+256, and the number of multiply-addition given when priority is placed on the column direction becomes 8Σqi+64Q=8S+192, respectively. It indicates that the number of operation times becomes smaller when priority is placed on the operation about the smaller one in either P or Q as a result of comparing P with Q.

Many widely different embodiments of the present invention may be constructed without departing from the spirit and scope of the present invention. It should be understood that the present invention is not limited to the specific embodiment described in the specification, except as defined in the appended claims.

What is claimed is:

1. An apparatus for performing an inverse discrete cosine transform, which replaces a two-dimensional inverse discrete cosine transform with at least two one-dimensional inverse discrete cosine transforms, said apparatus comprising:

first operating means for receiving two-dimensional data and for performing a first of said at least two one-dimensional inverse discrete cosine transforms with respect to a row direction or a column direction;

storing means, connected to said first operating means, for storing a result of said first of said at least two one-dimensional inverse discrete transforms performed by said first operating means;

second operating means connected to said storing means, for performing a second of said at least two one-dimensional inverse discrete cosine transforms with respect to said row direction or said column direction using said stored result, and for outputting a result of said second of said at least two one-dimensional inverse discrete transforms by said second operating means; and determining means for receiving said two-dimensional data and connected to said first operating means and said second operating means for counting both of a first number of said two-dimensional data with respect to said row direction and a second number of said two-dimensional data with respect to said column direction in order to output to said first operating means, a first control signal for performing said first of said at least two one-dimensional inverse discrete cosine transforms with respect to said column direction, and to output to said second operating means, a second control signal for performing said second of said at least two one-dimensional inverse discrete cosine transforms with respect to said row direction, when said first number is greater than said second number, and to output to said first operating means said second control signal and to output to said second operating means said first control signal, when said first number is not greater than said second number, each of said first number and said second number not including zero data.

2. An apparatus according to claim 1, wherein each of said first operating means and said second operating means includes a zero element detector for receiving predetermined input data and outputting a third control signal, and multiply-addition means for performing a multiply-addition operation on said predetermined input data according to said third control signal output from said zero element detector, said first operation means receiving said two-dimensional data as said predetermined data and said second operation means receiving said stored result as said predetermined data.

3. An apparatus according to claim 2, wherein said zero element detector outputs "0" as said third control signal when said predetermined input data is "0", and outputs "1" as said third control signal when said predetermined input data is not '0'.

4. An apparatus according to claim 2, wherein said multiply-addition means performs said multiply-addition operation using said predetermined input data and a cosine coefficient when said third control signal is "1".

* * * * *